US010801617B2

(12) United States Patent
Tollefsrud et al.

(10) Patent No.: US 10,801,617 B2
(45) Date of Patent: Oct. 13, 2020

(54) PROPEL SYSTEM WITH ACTIVE PUMP DISPLACEMENT CONTROL FOR BALANCING PROPEL PUMP PRESSURES IN AGRICULTURAL VEHICLES

(71) Applicant: CNH Industrial America LLC, New Holland, PA (US)

(72) Inventors: Aaron Tollefsrud, Willmar, MN (US); Daniel Connolly, Benson, MN (US); James Keppers, Sunburg, MN (US); Peter Meyer, Holloway, MN (US)

(73) Assignee: CNH Industrial America LLC, New Holland, PA (US)

( * ) Notice: Subject to any disclaimer, the term of this patent is extended or adjusted under 35 U.S.C. 154(b) by 339 days.

(21) Appl. No.: 15/862,986

(22) Filed: Jan. 5, 2018

(65) Prior Publication Data

US 2019/0211924 A1 Jul. 11, 2019

(51) Int. Cl.
| | |
|---|---|
| *F16H 61/448* | (2010.01) |
| *B60K 17/10* | (2006.01) |
| *F15B 21/08* | (2006.01) |
| *F16H 39/02* | (2006.01) |
| *F16H 61/42* | (2010.01) |
| *B60K 7/00* | (2006.01) |
| *F15B 11/17* | (2006.01) |

(52) U.S. Cl.
CPC ......... *F16H 61/448* (2013.01); *B60K 7/0015* (2013.01); *B60K 17/10* (2013.01); *F15B 21/08* (2013.01); *F16H 39/02* (2013.01); *F16H 61/42* (2013.01); *B60Y 2200/22* (2013.01); *F15B 11/17* (2013.01); *F15B 2211/20546* (2013.01)

(58) Field of Classification Search
CPC ..... F16H 61/448; B60K 7/0015; B60K 17/10; F15B 21/08
USPC ............................................. 60/445
See application file for complete search history.

(56) References Cited

U.S. PATENT DOCUMENTS

| | | | |
|---|---|---|---|
| 3,477,225 A | 11/1969 | Cryder et al. | |
| 4,203,712 A | 5/1980 | Uehara | |
| 4,458,485 A * | 7/1984 | Seelmann ............ | B62D 11/183 180/6.48 |
| 4,801,247 A | 1/1989 | Hashimoto et al. | |
| 4,934,143 A | 6/1990 | Ezell et al. | |
| 5,133,644 A | 7/1992 | Barr et al. | |
| 5,159,812 A | 11/1992 | Nikolaus | |
| 5,226,290 A | 7/1993 | Phillips | |

(Continued)

OTHER PUBLICATIONS

ASME (American Society of Mechanical Engineers, "Graphic Symbols for Fluid Power Diagrams". 1967, New York, NY.) (Year: 1967).*

*Primary Examiner* — Nathaniel E Wiehe
*Assistant Examiner* — Richard C Drake
(74) *Attorney, Agent, or Firm* — Rebecca L. Henkel; Rickard K. DeMille

(57) ABSTRACT

A propel system of an agricultural vehicle has an active pump displacement control system for equalizing or balancing pressure output of hydrostatic pumps of a tandem pump propel arrangement. The active pump displacement control system may include a pressure sensor(s) for determining output pressure of hydrostatic pumps and use the output pressure values within a feedback loop to provide coil input values of coils that control displacement of the hydrostatic pumps so that the pressure outputted by the hydrostatic pumps can be equalized in real-time while on the go during use of the agricultural vehicle.

18 Claims, 3 Drawing Sheets

(56) References Cited

U.S. PATENT DOCUMENTS

| | | | | |
|---|---|---|---|---|
| 5,267,441 A | * | 12/1993 | Devier | E02F 9/2221 60/452 |
| 5,360,320 A | | 11/1994 | Jameson et al. | |
| 5,542,251 A | * | 8/1996 | Leibing | B60K 17/10 60/426 |
| 5,772,403 A | | 6/1998 | Allison et al. | |
| 5,875,631 A | * | 3/1999 | Smith | B60K 17/10 60/443 |
| 5,941,305 A | | 8/1999 | Thrasher et al. | |
| 6,244,831 B1 | * | 6/2001 | Kawabata | F04B 49/002 417/213 |
| 6,276,468 B1 | * | 8/2001 | Essig | B62D 11/005 180/307 |
| 6,688,102 B2 | * | 2/2004 | Oka | B60K 17/10 180/6.2 |
| 8,182,238 B2 | | 5/2012 | Frait | |
| 8,269,359 B2 | | 9/2012 | Boisvert et al. | |
| 8,528,427 B2 | | 9/2013 | Vrane et al. | |
| 2007/0113549 A1 | * | 5/2007 | Essig | F04B 23/06 60/487 |
| 2009/0057049 A1 | * | 3/2009 | Yamada | B62D 11/005 180/307 |
| 2011/0196585 A1 | * | 8/2011 | Ishibashi | E02F 9/202 701/51 |
| 2013/0098024 A1 | * | 4/2013 | Knussman | E02F 9/2242 60/420 |
| 2014/0060025 A1 | * | 3/2014 | Cesur | F15B 21/08 60/327 |
| 2015/0191897 A1 | * | 7/2015 | Zhang | E02F 9/2217 60/327 |
| 2016/0123354 A1 | * | 5/2016 | Morita | E02F 9/2217 60/327 |
| 2019/0093651 A1 | * | 3/2019 | Hines | F04B 53/1002 |
| 2020/0018043 A1 | * | 1/2020 | Udagawa | E02F 9/2235 |

* cited by examiner

PROPEL SYSTEM WITH ACTIVE PUMP DISPLACEMENT CONTROL FOR BALANCING PROPEL PUMP PRESSURES IN AGRICULTURAL VEHICLES

FIELD OF THE INVENTION

The invention relates generally to agricultural vehicle propel systems and, in particular, to a propel system with active pump displacement control, such as an active pump electronic pump displacement control system for balancing propel pump pressures.

BACKGROUND OF THE INVENTION

Hydrostatic propulsion drive systems in agricultural vehicles are known, some of which have tandem hydrostatic pumps that provide propulsion power. Typically, these tandem hydrostatic pump propel systems have two hydrostatic pumps that are manually set up at initial build. The set up includes checking the output pressure of each pump and then manually adjusting the pumps so that both pumps are initially calibrated to output hydraulic oil at the same pressure, with the goal of the two pumps equally sharing the propulsion load(s). However, over time during use, the output pressures of the pumps can vary. When the output pressures vary, one of the two pumps is required to do more work than the other. The pump that does more work tends to wear out faster, which can require a major service task to repair or replace the worn out pump earlier than had both pumps equally shared the propulsion load(s). Trying to periodically check and manually adjust or recalibrate the pumps is typically impractical for agricultural vehicle owners because doing so requires specialized tools, is challenging, and takes considerable time because disassembly of numerous components may be required to access the hydrostatic drive system.

SUMMARY OF THE INVENTION

A propel system of an agricultural vehicle is provided with an active pump displacement control system that provides automatic real-time adjustment of hydrostatic pumps to maintain equalized output pressure from both pumps of a tandem propel pump arrangement. This may be done by actively auto calibrating to control the output pressures of two individually electronically controlled hydrostatic pumps so they are substantially equal to each other.

According to one aspect of the invention, a propel system of an agricultural vehicle has an active pump displacement control system for equalizing pressure output of hydrostatic pumps of a tandem pump propel arrangement. The active pump displacement control system may include a pressure sensor(s) for determining output pressure of hydrostatic pumps and use the output pressure values within a feedback loop to provide coil input values of coils that control displacement of the hydrostatic pumps so that the pressure outputted by the hydrostatic pumps can be equalized in real-time, while on the go during use of the agricultural vehicle.

According to another aspect of the invention, a method of actively controlling pump displacement in a hydrostatic drive system of an agricultural vehicle with a tandem propel pump arrangement is provided. The method may include periodically or continuously recalibrating output pressure(s) of hydrostatic propel pumps, even real-time, while on the go during operation of the agricultural vehicle. A first pressure value is detected that corresponds to an output circuit pressure of a first hydrostatic pump of the tandem propel pump arrangement. A first coil input value is detected that corresponds to a signal transmitted to a first coil for controlling displacement of the first hydrostatic pump. A second pressure value is detected that corresponds to an output circuit pressure of a second hydrostatic pump of the tandem propel pump arrangement. A second coil input value is detected that corresponds to a signal transmitted to a second coil for controlling displacement of the second hydrostatic pump. A comparison is made between the first and second pressure values to provide a detected pressure difference value. A determination may be made whether the pressure difference value is greater than a threshold pressure difference value. When the detected pressure difference value is greater than the threshold pressure difference value, at least one of the first and second coils may be controlled to correspondingly control displacement of at least one of the first and second hydrostatic pumps to reduce the pressure difference value.

According to another aspect of the invention, at least one pressure transducer is used for detecting the first and second pressure values. An output value from the pressure transducer is used for determining a control input value for at least one of first and second coils to control displacement of the first and/or second hydrostatic pump(s). An active pump displacement control system may use the output value from the pressure transducer for determining the control input value for the coil(s) as a feedback loop for equalizing pressure from the first and second hydrostatic pumps.

According to another aspect of the invention, a propel system with active pump displacement control for an agricultural vehicle is provided. The propel system includes multiple hydraulic wheel motors arranged to rotate wheels of an agricultural vehicle to propel the agricultural vehicle. A hydrostatic drive system is configured to selectively deliver hydraulic oil to the wheel motors for controlling rotation of the wheels for moving the agricultural vehicle. The hydrostatic system includes a first hydrostatic pump with variable displacement configured to deliver hydraulic oil to the wheel motors. A second hydrostatic pump with variable displacement is configured to deliver hydraulic oil to the wheel motors. A hydraulic distribution manifold is arranged between the hydrostatic pumps and the wheel motors, and the hydraulic distribution manifold receives hydraulic oil from each of the first and second hydrostatic pumps and delivers it to the wheel motors, An active pump displacement control system monitors output pressures of the hydrostatic pumps and controls their displacement to attenuate differences between their output pressures.

According to another aspect of the invention, a sensor(s) detects the output pressures of the first and second hydrostatic pumps. The active pump displacement control system evaluates the output pressures of the pumps based on values that are detected by the sensor(s). When the active pump displacement control system determines that a pump pressure difference value is outside of a target range, the active pump displacement control system commands changing displacement of at least one of the first and second hydrostatic pumps to reduce the pump pressure difference.

According to another aspect of the invention, the first hydrostatic pump defines a first pump output circuit, and the second hydrostatic defines a second pump output circuit, and the first and second pressure transducers may be arranged within the first and second pump output circuits for detecting pressures within the first and second pump output circuits.

According to another aspect of the invention, the active pump displacement control system controls displacement of the first and second hydrostatic pumps to match the pressures of the first and second pump output circuits to each other within a pressure differential target range. The first hydrostatic pump may include a first coil that is selectively energized to control the first pump's displacement of the first hydrostatic pump, and the second hydrostatic pump may include a second coil that is selectively energized to control the second pump's displacement. The active pump displacement control system is operatively connected to each of the first and second coils and selectively energizes the coils to control displacement of the hydrostatic pumps. The active pump displacement control system may selectively energize the coil of the lower pressure hydrostatic pump to increase its output pressure. The active pump displacement control system may selectively energize the coil of the higher pressure hydrostatic pump to decrease its output pressure. The active pump displacement control system may selectively energize both coils to adjust the output pressures of both the hydrostatic pumps by increasing the output pressure of the lower pressure hydrostatic pump and decreasing the upper pressure of the high pressure hydrostatic pump.

According to another aspect of the invention, either a single delta pressure transducer is installed to monitor hydraulic drive pressures or two separate pressure transducers are installed in the separate hydraulic drive output circuits to monitor the hydraulic drive pressures. The propel controller monitors the coil input(s) of the hydrostatic motors and may use the pressure transducer output(s) as a feedback loop for automatic, real-time adjustment of hydrostat displacement to ensure equal pressure on both hydrostatic pumps. This allows auto calibrating of the hydrostatic pumps to equally share propulsion loads to increase their use life and also allows parts to be removed/replaced/serviced from the unit while requiring fewer manual adjustments afterward.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
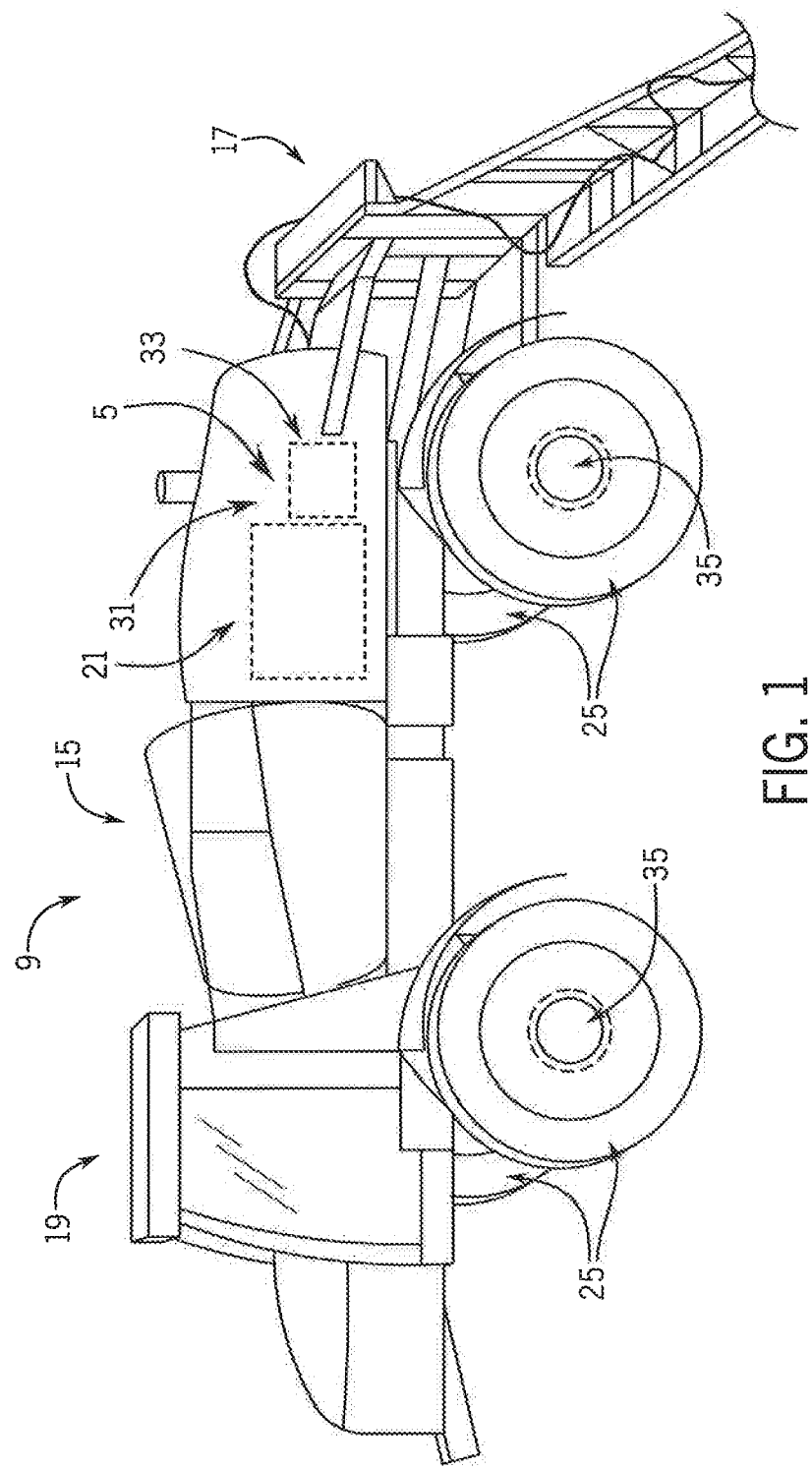
FIG. 1 is a pictorial view of an agricultural vehicle with an active pump displacement control system according to the present invention.

Referring now to the drawings and specifically to FIG. 1, an active pump displacement control system 5 is provided that provides automatic real-time adjustment of hydrostatic pumps to balance and, for example, maintain equalized output pressures, explained in greater detail elsewhere herein, for an agricultural vehicle 9. Agricultural vehicle 9 may be an off-road agricultural vehicle 9, represented as an applicator 15, which is shown as a rear-boom sprayer vehicle, such as those available from CASE IH as the Trident™ Series Combination applicator and Patriot® Series sprayers. Although applicator 15 is shown as a rear-boom self-propelled sprayer, it is understood that applicator 15 can instead be configured as a dry product spreader with a dry box or spinner box for broadcast-type delivery of dry product. Furthermore, applicator 15 can instead be a front-boom sprayer, such as those available from CNH Industrial, including the Miller Nitro and New Holland Guardian Series front-boom sprayers, and it is further understood that agricultural vehicle 9 may include other self-propelled implements, tractors, or other agricultural vehicles 9.

Referring again to FIG. 1, applicator 15 includes a chassis with a frame that supports various assemblies, systems, and components. These various assemblies, systems, and components may include boom system 17, cab 19, and an engine 21 housed under a hood in an engine compartment. Wheels 25 are rotated by propel system 31 which includes hydrostatic drive system 33 that receives power from engine 21 to propel the applicator 15. Hydrostatic drive system 33 includes wheel drives with wheel motors 35 that receive pressurized hydraulic oil from hydrostatic drive system 33 and are arranged to rotate the wheels 25.

Figure 2:
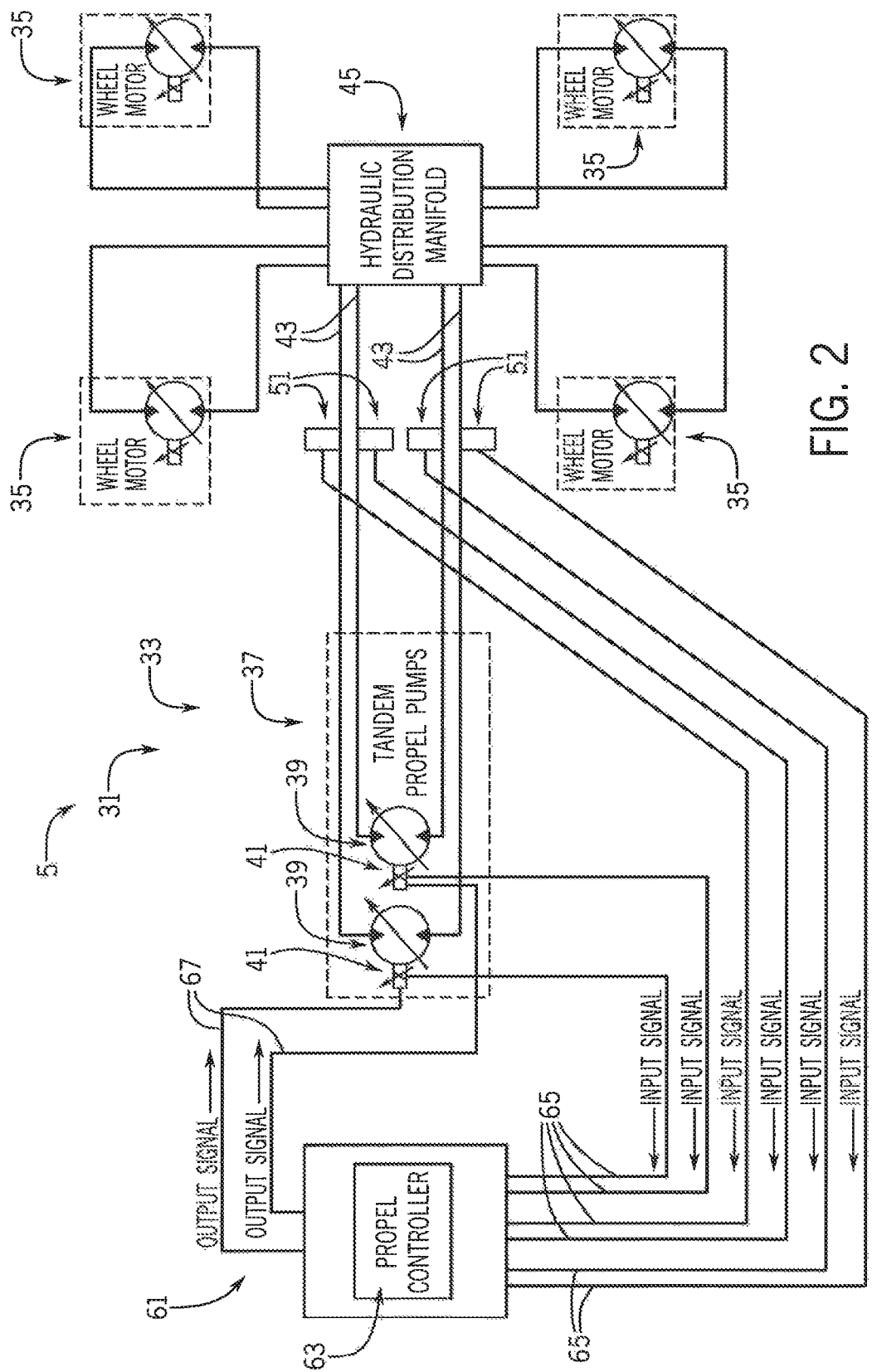
FIG. 2 is a simplified schematic representation of the active pump displacement control system of FIG. 1.

Referring now to FIG. 2, hydrostatic drive system 33 includes a hydrostatic pump system, shown here as tandem propel pump arrangement 37 that has two hydrostatic pumps 39. Each hydrostatic pump 39 can be an axial or other variable displacement pump with, for example, a variable position swashplate that is tilted at a variable angle to control the pump displacement. The hydrostatic pumps 39 may be configured as electronic displacement control-type pumps with control coils shown as coils 41 that are selectively energized to control swashplate position and corresponding pump displacement. Selectively energizing the coils 41 may be done through a controlled current or voltage sources to respectively vary the application of current or voltage applied to the coils 41 or by way of pulse width modulation of a control signal. Hydrostatic pumps 39 have output circuits 43 for delivering pressurized hydraulic oil toward wheel motors 35. Output circuits 43 are shown here delivering hydraulic oil to hydraulic distribution manifold 45 that delivers the hydraulic oil to the wheel motors 35.

Still referring to FIG. 2, sensors 51 detect output pressures of hydrostatic pumps 39, shown here arranged in the output circuits 43 of hydrostatic pumps 39. Sensors 51 may be pressure transducer-type sensors. The pressure transducer(s) may be a delta pressure transducer that can detect a pressure differential between the first and second hydrostatic pumps 39. In such implementation, a single sensor 51 may be provided that has two fitting, leads, probes, or other hardware connected to the output circuits 43 to allow the delta pressure transducer to sense their respective pressures. Sensors 51 are shown here as first and second pairs of sensors arranged at the forward and reverse sides of the hydrostat output circuits 43, which may be pairs of pressure transducers arranged at the output circuits 43 to detect output pressures of the first and second hydrostatic pumps 39.

Still referring to FIG. 2, active pump displacement control system 61 is configured to use the sensors 51 to monitor output pressures of the first and second hydrostatic pumps 39 and control displacement of the first and second hydrostatic pumps to attenuate differences between the output pressures of the pumps 39.

Active pump displacement control system 61 includes a power supply and at least one controller, shown here as propel controller 63, which may be an industrial computer or, e.g., a programmable logic controller (PLC), along with corresponding software and suitable memory for storing such software and hardware, including interconnecting conductors for power and signal transmission for controlling respective electronic, electro-mechanical and hydraulic components that may be in the active pump displacement control system 5. Propel controller 63 evaluates signals such as input signals 65 from coils 41 and sensors 51 and delivers control signals such as output signals 67 to coils 41 for auto calibrating tandem propel pump arrangement 37 by controlling the output pressures hydrostatic pumps 39 so that the output pressures are substantially equal to each other, even in real-time or on the go during use of agricultural vehicle 9.

Figure 3:
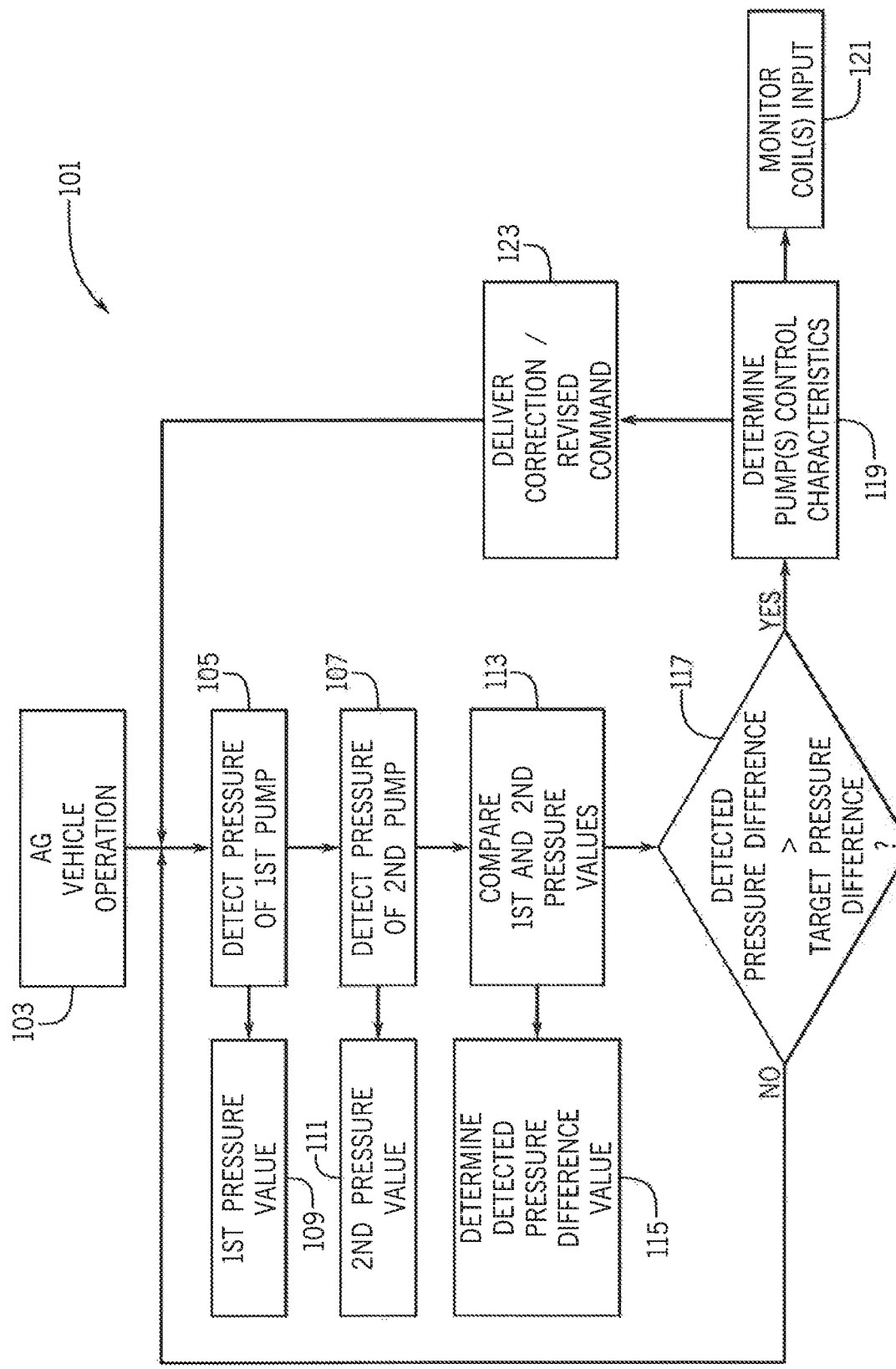
FIG. 3 is a flow diagram of a method of using the active pump displacement control system of FIG. 1.

Referring now to FIG. 3 with background reference to FIG. 2 for illustrating components and systems, one exemplary method 101 is represented in the flow diagram. As represented at block 103, during the method 101, active pump control system 61 actively balances propel pump output pressures during operation of agricultural vehicle 9. The method 101 may be performed automatically and continuously during use or periodically such as an initial session calibration after startup and initial movement of the agricultural vehicle 9, which may occur after a sufficient warm-up period as determined by time or obtaining an appropriate operating temperature of hydraulic oil or another fluid or component. It is further understood that method 101 may be performed periodically multiple times during a single use session of agricultural vehicle 9, which may occur based on operational time of the current session or a change in state of various systems within the agricultural vehicle 9. As represented at blocks 105, 107, active pump control system 61 detects pressures of the hydrostatic pumps 39 to provide corresponding first and second pressure values, as shown in blocks 109, 111.

Still referring to FIG. 3, active pump control system 61 compares the first and second pressure values for the first and second hydrostatic pumps 39 to each other, as represented at block 113 to determine a detected pressure difference value at block 115. Block 117 represents an evaluation of the detected pressure difference value to a target pressure difference value during which the active pump control system 61 determines whether an observed pressure differential is within the target range. The target range may provide the pump pressures at substantially equal values, for example, plus or minus 5% or plus or minus 5 PSI (pounds per square inch). If the observed pressure differential is within the target range, then active pump control system 61 continues to monitor the pressures of pumps 39 at blocks 105, 107, 113 along with their corresponding values at blocks 109, 111, and 115. If the observed pressure differential is outside of the target range with the detected pressure difference being greater than the target pressure difference, then active pump control system 61 performs a balancing-type corrective action that calibrates and equalizes the pump pressures.

Still referring to FIG. 3, block 119 represents the active pump control system 61 determining the pump control characteristics, which may be done for both pumps 39 or for a single one that is to be corrected, such as the lower pressure pump or the greater pressure pump. This may include monitoring the input for coil 41 to see what command is providing the non-desirable result(s), as represented at block 121, In this way, a first pressure value is detected with sensor 51 that corresponds to an output circuit pressure of the first hydrostatic pump 39, and a corresponding first coil input value is detected during monitoring of coil 41 that corresponds to a signal transmitted to the coil 41 for controlling the first pump's displacement. A second pressure value is detected with sensor 51 that corresponds to an output circuit pressure of the second hydrostatic pump 39, and a corresponding second coil input value is detected during monitoring of coil 41 that corresponds to a signal transmitted to the coil 41 for controlling the second pump's displacement. As represented at block 123, a correction or revised command is given to at least one of the pumps 139, such as a revised control command to the respective coil(s) 41. Doing so adjusts the displacement of the pump(s) 39 and its corresponding output pressure. The active pump control system 61 continues to monitor the adjusted output pressure(s) through sensors 51 of the pumps 39 at blocks 105, 107, 113 along with their corresponding values at blocks 109, 111, and 115. The active pump displacement control system 61 may selectively energize the coil 41 of the lower pressure hydrostatic pump 41 to increase its output pressure, selectively energize the coil 41 of the higher pressure hydrostatic pump 39 to decrease its output pressure, or simultaneously adjust both the lower and higher pressure pumps 39 toward an intermediate value. Regardless of what particular adjustments to pump displacement(s) are commanded by active pump displacement control system 61, they may be provided as a feedback loop using output pressure values from the pressure transducers or other sensors 51 to provide coil input values of coils 41 that control displacement of the hydrostatic pumps 39 so that the pressure outputted by the hydrostatic pumps 39 can be equalized in real-time while on the go during use of the agricultural vehicle 9.

Many changes and modifications could be made to the invention without departing from the spirit thereof. The scope of these changes will become apparent from the appended claims.

We claim:

1. A propel system with active pump displacement control for balancing propel pump pressures in an agricultural vehicle with wheels that can be rotated to propel the agricultural vehicle, the propel system comprising:

a hydrostatic drive system configured to rotate the wheels with hydraulic power to propel the agricultural vehicle, the hydrostatic drive system including, multiple hydraulic wheel motors arranged to rotate the wheels of the agricultural vehicle;

a hydrostatic pump system configured to selectively deliver hydraulic oil to the wheel motors for controlling rotation of the wheels of the agricultural vehicle, the hydrostatic pump system including, a first hydrostatic pump with variable displacement configured to deliver hydraulic oil to the wheel motors for controlling rotation of the wheels of the agricultural vehicle;

a second hydrostatic pump with variable displacement configured to deliver hydraulic oil to the wheel motors for controlling rotation of the wheels of the agricultural vehicle; and a hydraulic distribution manifold arranged between the wheel motors and the first and second hydrostatic pumps, wherein the hydraulic distribution manifold is configured to receive hydraulic oil from each of the first and second hydrostatic pumps and deliver the hydraulic oil to the wheel motors; and an active pump displacement control system including:
at least one sensor disposed between the first and second hydrostatic pumps and the hydraulic distribution manifold and configured to detect the output pressures of the first and second hydrostatic pumps;
a controller operatively connected to the at least one sensor and the first and second hydrostatic pumps, the controller adjusting displacement of the first and second hydrostatic pumps in response to output pressures of the first and second hydrostatic pumps detected by the at least one sensor to attenuate differences between the output pressures of the first and second hydrostatic pumps.

2. The propel system of claim 1, wherein
when the active pump displacement control system determines that a pump pressure difference value between the output pressures of the first and second hydrostatic pumps is outside of a target range, the controller adjusts displacement of at least one of the first and second hydrostatic pumps to reduce the difference between the output pressures of the first and second hydrostatic pumps.

3. The propel system of claim 2, wherein the at least one sensor is a pressure transducer.

4. The propel system of claim 3, wherein the pressure transducer is a delta pressure transducer that communicates with each of the first and second hydrostatic pumps and is configured to detect a pressure differential between the first and second hydrostatic pumps.

5. The propel system of claim 1, wherein the at least one sensor includes,
a first pressure transducer arranged for detecting an output pressure of the first hydrostatic pump; and
a second pressure transducer arranged for detecting an output pressure of the second hydrostatic pump.

6. The propel system of claim 1, wherein the controller adjusts displacement of the first and second hydrostatic pumps to be within a pressure differential target range.

7. The propel system of claim 6, wherein the first hydrostatic pump includes a first coil that is selectively energized to control the displacement of the first hydrostatic pump and the second hydrostatic pump includes a second coil that is selectively energized to control displacement of the second hydrostatic pump.

8. The propel system of claim 7, wherein the controller is operatively connected to each of the first and second coils and selectively energizes ones of the first and second coils to control displacement of at least one of the first and second hydrostatic pumps to adjust the output pressures of in a corresponding one of the first and second hydrostatic pumps.

9. The propel system of claim 8, wherein the controller selectively energizes one of the first and second coils to increase displacement of a lower pressure one of the first and second hydrostatic pumps.

10. The propel system of claim 8, wherein the controller selectively energizes one of the first and second coils to decrease displacement of a greater pressure one of the first and second hydrostatic pumps.

11. The propel system of claim 8, wherein the controller selectively energizes each of the first and second coils to simultaneously,
increase displacement of a lower pressure one of the first and second hydrostatic pumps; and
decrease displacement of a greater pressure one of the first and second hydrostatic pumps.

12. A propel system with active pump displacement control for balancing propel pump pressures in an agricultural vehicle, the propel system comprising:
multiple hydraulic wheel motors arranged to rotate wheels of the agricultural vehicle to propel the agricultural vehicle;
a tandem propel pump arrangement configured to selectively deliver hydraulic oil to the wheel motors for controlling rotation of the wheels of the agricultural vehicle, the tandem propel pump arrangement including:
a first hydrostatic propel pump with variable displacement and configured to deliver pressurized hydraulic oil at a variable pressure at a first pump output circuit pressure;
a second hydrostatic propel pump with variable displacement and configured to deliver pressurized hydraulic oil at a variable pressure at a second pump output circuit pressure; and
a hydraulic distribution manifold arranged between the wheel motors and the first and second hydrostatic pumps, wherein the hydraulic distribution manifold is configured to receive hydraulic oil from each of the first and second hydrostatic pumps and deliver the hydraulic oil to the wheel motors;
an active pump displacement control system, including:
at least one sensor disposed between the first and second hydrostatic pumps and the hydraulic distribution manifold and configured to detect the first and second pump output circuit pressures; and
a propel controller operably communicating with the at least one sensor and each of the first and second hydrostatic propel pumps and configured to adjust displacement of at least one of the first and second hydrostatic propel pumps in response to the first and second pump output circuit pressures detected by the at least one sensors to attenuate a difference between the first and second pump output circuit pressures.

13. The propel system of claim 12, wherein the at least one sensor is a delta pressure transducer that communicates with each of the first and second hydrostatic pumps and is configured to detect a pressure differential between the first and second hydrostatic pumps.

14. The propel system of claim 12, wherein the at least one sensor includes,
a first pressure transducer arranged for detecting the first pump output circuit pressure; and
a second pressure transducer arranged for detecting the second pump output circuit pressure.

15. The propel system of claim 12, wherein the first hydrostatic pump includes a first coil that is selectively energized to control the displacement of the first hydrostatic pump and the second hydrostatic pump includes a second coil that is selectively energized to control displacement of the second hydrostatic pump; and
wherein the propel controller is operatively connected to each of the first and second coils and selectively energizes ones of the first and second coils to control displacement of at least one of the first and second hydrostatic pumps to attenuate differences between the first and second pump output circuit pressures.

16. A method of actively controlling pump displacement in a hydrostatic drive system of an agricultural vehicle with a tandem propel pump arrangement to balance propel pump pressures, the method comprising:
while on the go during operation of the agricultural vehicle, detecting a first pressure value that corresponds to an output circuit pressure of a first hydrostatic pump of the tandem propel pump arrangement upstream of a hydraulic distribution manifold arranged between wheel motors and the first hydrostatic pump, wherein the hydraulic distribution manifold is configured to receive hydraulic oil from the first hydrostatic pump and deliver the hydraulic oil to the wheel motors;

detecting a first coil input value that corresponds to a signal transmitted to a first coil for controlling displacement of the first hydrostatic pump;

detecting a second pressure value that corresponds to an output circuit pressure of a second hydrostatic pump of the tandem propel pump arrangement upstream of the hydraulic distribution manifold arranged between wheel motors and the first hydrostatic pump, wherein the hydraulic distribution manifold is configured to receive hydraulic oil from the second hydrostatic pump and deliver the hydraulic oil from the second hydrostatic pump to the wheel motors;

detecting a second coil input value that corresponds to a signal transmitted to a second coil for controlling displacement of the second hydrostatic pump;

comparing the first and second pressure values corresponding to the output circuit pressures of the first and second hydrostatic pumps to provide a detected pressure difference value;

determining whether the pressure difference value is greater than a threshold pressure difference value; and when the detected pressure difference value is greater than the threshold pressure difference value, controlling of at least one of the first and second coils for correspondingly controlling displacement of at least one of the first and second hydrostatic pumps to reduce the pressure difference value.

17. The method of claim 16, wherein at least one pressure transducer is used for detecting the first and second pressure values and the method further comprises, using an output value from the pressure transducer for determining a control input value for at least one of first and second coils that control displacement of the first and second hydrostatic pumps.

18. The method of claim 17, wherein an active pump displacement control system is configured to control displacement of the first and second hydrostatic pumps and wherein the method further comprises:

in the active pump displacement control system,
using the output value from the pressure transducer and the control input value for at least one of the first and second coils as a feedback loop for equalizing pressure from the first and second hydrostatic pumps.

\* \* \* \* \*